Aug. 10, 1954 R. W. GOBLE 2,685,798
APPARATUS FOR MEASURING AND INDICATING VARIOUS
CONDITIONS SUCH AS TEMPERATURE AND PRESSURE
Filed May 15, 1947 5 Sheets-Sheet 1

Ralph W. Goble
INVENTOR.

BY Joe E. Edwards

ATTORNEY

Ralph W. Goble
INVENTOR.

BY Jos E. Edwards

ATTORNEY

Fig. 11    Fig. 12    Fig. 13

Ralph W. Goble
INVENTOR.

BY Jod E. Edwards
ATTORNEY

Patented Aug. 10, 1954

2,685,798

UNITED STATES PATENT OFFICE 2,685,798

APPARATUS FOR MEASURING AND INDICATING VARIOUS CONDITIONS SUCH AS TEMPERATURE AND PRESSURE

Ralph W. Goble, Long Beach, Calif., assignor to Eastman Oil Well Survey Company, Denver, Colo., a corporation of Delaware Application May 15, 1947, Serial No. 748,186

2 Claims. (Cl. 73—345)

This invention relates to new and useful improvements in apparatus for measuring and indicating various conditions, such as temperature and pressure.

One object of the invention is to provide an improved apparatus for measuring and indicating temperature and pressure which is particularly adapted for use in measuring and recording the temperature and pressure variations occurring within a well bore.

In the measurement of well bore temperatures, pressures or the like, a measurement unit having a temperature or pressure responsive element therein is lowered into the well bore on a conductor cable which functions not only to support the unit but also as an electrical connector for connecting said unit to the surface indicating and recording equipment. Since the cable is, of course, disposed within the well bore it is subjected to the temperature and other well conditions therein and if said cable forms part of the electrical circuit the variations in the reactance and capacitance in said cable as caused by the changing temperatures or other conditions encountered by the cable results in erroneous measurements and indications at the surface.

It is, therefore, an important object of the present invention to provide an improved apparatus for measuring and indicating well bore temperatures, pressures, and the like, which is so arranged and constructed that the effect of well conditions on the lowering cable or line are nullified, whereby accurate measurements may be made.

Still another object of the invention is to provide an improved temperature measurement apparatus for determining well bore temperature wherein an electrically operated measurement unit is arranged to be lowered within the well bore on a single conductor cable and also wherein said single conductor cable is utilized to conduct the required operating power to said unit and at the same time functions as the carrier for transmitting the intelligence to the surface indicating and recording equipment.

Still another object of the invention is to provide an improved temperature measuring and indicating apparatus, wherein electrical pulses are generated and transmitted and have their frequency or rep rate controlled by or in accordance with the temperature encountered within the well bore; said apparatus also including means at the surface for receiving said pulses and transposing the frequency or rep rate thereof into amplitude, whereby a suitable indicating or recording mechanism may be actuated to visibly indicate or record the temperatures encountered within said well bore.

Still another object of the invention is to provide an improved apparatus of the character described, wherein the frequency or rep rate of transmitted electrical impulses is employed as a timing constant to control the operation of the indicating or recording mechanism, whereby any change in the electrical properties of the conductor cable does not affect the accurate operation of the apparatus.

A still further object of the invention is to provide an improved apparatus of the character described, for measuring and indicating pressure changes occurring within the well bore; the method and apparatus also being adaptable for use in measuring and indicating both pressure and temperature variations simultaneously, whereby accurate readings of these conditions within the well bore may be obtained at the same time.

The construction designed to carry out the invention will be hereinafter described together with other features of the invention.

The invention will be more readily understood from a reading of the following specification and by reference to the accompanying drawing, wherein an example of the invention is shown, and wherein.

Figures 1, 2:
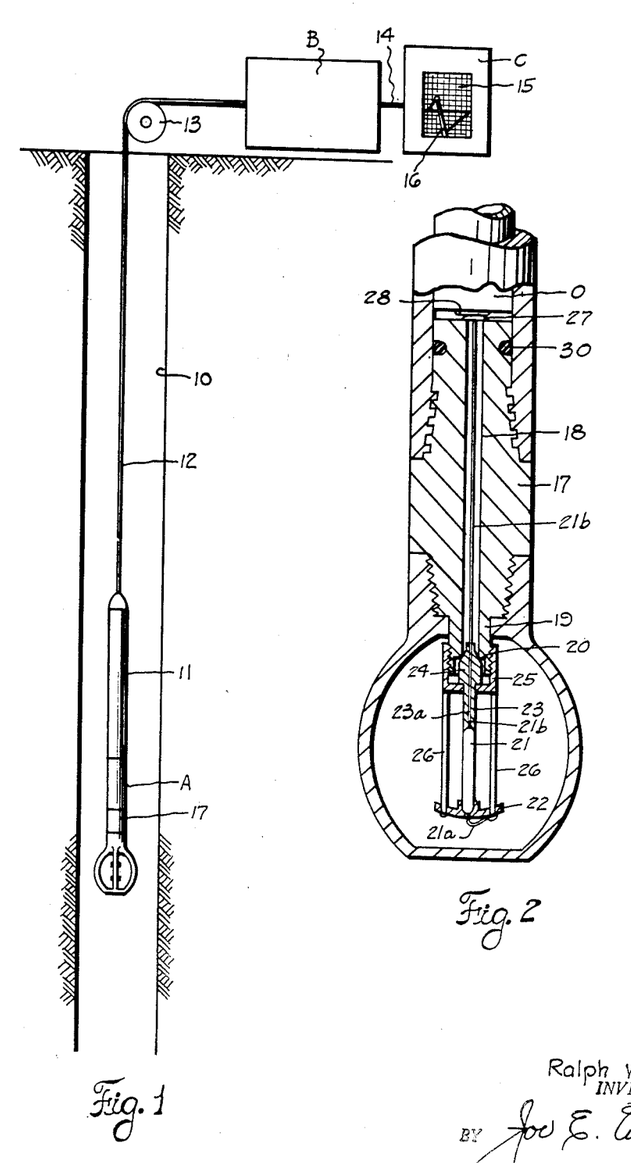
Figure 1 is a schematic view of a well bore showing an apparatus constructed in accordance with the invention for carrying out the improved method having its measuring unit lowered within the bore and its indicating and recording mechanism located at the surface.
Figure 2 is an enlarged transverse sectional view of the temperature measuring unit which is lowered through the well bore.

In the drawings, the numeral 10 designates a well bore which extends downwardly through the sub-surface strata from the ground surface. A temperature measuring unit A, which will be hereinafter described in detail, is arranged to be lowered within the well bore and said unit is connected to the lower end of a sinker or lowering bar 11. The sinker bar is attached to the lower end of a conductor cable 12 and said cable functions to suspend or support the measuring unit assembly and at the same time provides an electrical connection between the unit A and the surface equipment. The cable extends upwardly to the surface and passes over a suitable pulley 13 in the derrick (not shown) and has electrical connection with a receiving and measuring unit B. The unit B has electrical connection through a conductor 14 with a recorder C.

The recorder is of standard construction and may be any suitable electrical recording mechanism, said recorder being preferably a GE photoelectric recorder, type No. 8CE2CK27. The recorder includes a movable tape 15 which is adapted to be traversed by a marking stylus 16. Although it is preferable that the above identified GE recorder be employed, it is pointed out any suitable electrically-actuated recording mechanism may be used.

The measuring unit A which is lowered within the well bore is, of course, affected by the temperature changes occurring within said bore. As will be explained, these temperature changes acting upon the Unit A are transposed into electrical pulses of a frequency or rep rate proportional to the temperature and said pulses are conducted to the receiving unit B at the surface. The frequency or rep rate of the electrical pulses will, of course, vary proportionately to the temperature changes or variations acting upon the unit A and said frequency or rep rate is employed to operate the electrically-actuated recorder C. Thus, the stylus of the recorder C is moved across the recording tape 15 in direct ratio or proportion to the temperature changes which are encountered by the measuring unit A and therefore, said stylus will accurately indicate and record the well bore temperature acting upon the measuring unit A. The movable chart 16 is synchronized in its movement with the movement of the measuring unit A being lowered so that the elevation within the well bore at which the temperature changes occur is accurately indicated.

The physical construction of the measuring unit A is subject to variation and one form of said unit is illustrated in Figure 2. As shown in this figure, the unit includes a mandrel or support 17 which has its upper portion connected to the lower end of an oscillator O which is in turn connected to the sinker bar 11. The mandrel or support has an axial bore 18 extending entirely therethrough. The lower end of the mandrel is formed with a reduced sleeve 19 which has the extreme lower end of its bore counter-bored to provide an internal annular shoulder or seat 20. A thermistor 21, which is actually an electrical resistance, has its lower end supported upon a plate 22, while its upper end is confined in the recessed underside of a cylindrical retaining member 23. The retaining member is formed with a conical head 24 at its upper end which head is adapted to be engaged with the seat 20 within the sleeve 19 of the mandrel 17. The head 24 is secured in a seated position by a retaining collar 25 which threads onto the sleeve 19. The retaining collar 25 is suitably fastened to the supporting plate 22 by vertically extending rods 26 which connect the parts together. In this manner when the retaining collar 25 is tightened to urge the head 24 into its seated position, the supporting plate 22 is pulled upwardly at the same time to thereby maintain the thermistor 21 in its supported position.

The thermistor has one side grounded through a wire 21a to the supporting plate 22. The other side thereof has a lead-out wire 21b which extends upwardly through an axial bore 23a formed in the cylindrical retaining member 23 and thence upwardly through the bore 18 of the mandrel. The wire 21b has its upper end electrically connected to a contact 27 provided in the top of the mandrel. This contact is engaged with a contact 28 carried by the oscillator O and a conductor 29 extends upwardly from the oscillator O through the sinker bar and thence through the conductor cable 12 to the surface. The joint formed between the oscillator O and the mandrel 17 is packed off by a suitable packing ring 30 which is confined within an external groove in the upper portion of the mandrel and which engages the bore of the sinker bar.

The thermistor or electrical resistance 21 is, as will be explained, connected in the electrical circuit of the pulse oscillator O and as said thermistor is lowered through the well bore it is, of course, subjected to the temperature present within said bore. The variation in temperature will result in a variation in the electrical resistance properties of the thermistor and the change in said resistance will be directly proportional to the temperature changes encountered. The variations in the electrical resistance properties of the thermistor are utilized to control or vary the frequency or rep rate of the electrical pulses which are generated and transmitted by the oscillator O and thus the variation in frequency or rep rate of said electrical pulses will be directly proportional to the temperature variations encountered. The electrical pulses, having a frequency or rep rate representative of temperature, are transmitted upwardly to the surface and through the various circuits which are provided in the receiving and measuring apparatus B, are utilized to actuate the recorder C. Thus, the stylus 16 of said recorder is controlled in its operation by the frequency or rep rate of the transmitted pulses and thereby visibly records the temperature conditions as they are encountered by the thermistor 21.

The pulse oscillator O may be subject to some variation and is arranged so as to generate and transmit negative electrical pulses. Referring to the wiring diagram of this oscillator which shows one form of oscillator which may be employed (Fig. 8), the unit includes a blocking oscillating circuit which comprises coils 30 and 31, condenser 32 and the resistance or thermistor 21.

Figures 3, 4, 5, 6, 7, 8:
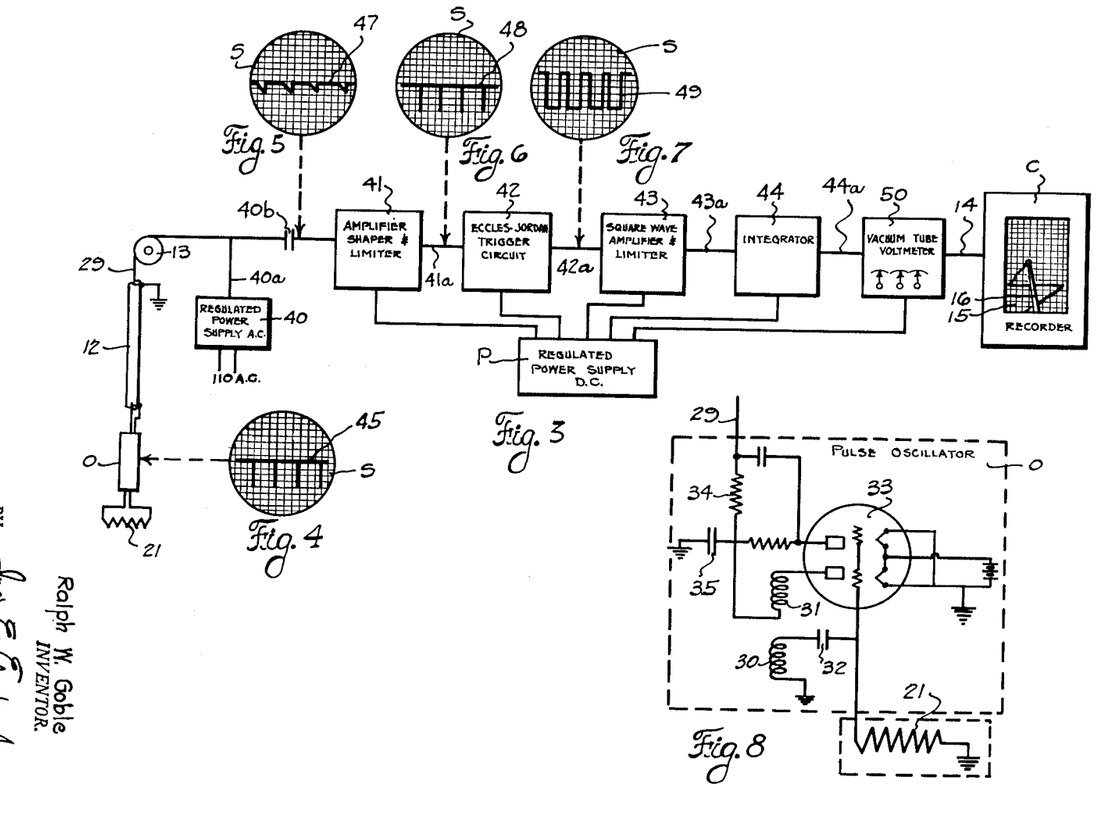
Figure 3 is a block diagram of the temperature measuring apparatus.
Figures 4 to 7 are face views of an oscilloscope screen illustrating the wave forms of the transmitted electrical pulses as they appear at various points in the apparatus.
Figure 8 is a wiring diagram of the pulse oscillator and temperature responsive element.

An amplifier tube 33 is coupled in the circuit and is arranged so as to amplify only the negative side of the oscillator cycle. The thermistor or resistance 21 is a negative temperature coefficient resistance with the result that when the oscillator O is operating, only negative pulses are generated and transmitted. The frequency of the transformer coils 30 and 31 is controlled by the RC circuit which comprises the condenser 32 and resistance 21 so that actually the resistance 21 controls the time required to discharge the condenser 32. As the resistance 21 reduces in value due to its encountering higher temperature, the discharging time of the condenser 32 is reduced accordingly and thus, the frequency or rep rate of the transmitted negative pulses is controlled by this RC circuit and is varied in direct ratio to the variations in the temperature encountered. A filter resistor 34 is connected in the conductor 29 which extends to the surface and a filter condenser 35 is associated therewith and these parts function to prevent feeding back of the transmitted pulses into the blocking oscillator circuit.

It will be obvious that this arrangement of the oscillator O results in the generation and transmission of electrical pulses which are conducted upwardly to the surface through the conductor 29. The frequency or rep rate of these pulses is controlled and varied in direct proportion to the variation in the temperature encountered by the electrical resistance or thermistor 21 and thus, it might be said that the frequency or rep rate of the transmitted negative electrical pulses is representative of the temperature encountered by the thermistor.

The receiving unit B and recorder C is illustrated in block diagram in Figure 3 and as shown therein the cable 12 and conductor 29 therein extend upwardly from the oscillator O to the surface. The required power for operating the oscillator O is furnished by a regulated power supply 40 which has connection through a conductor 40a with the conductor 29, whereby the conductor functions to carry the current required to operate the oscillator and is also the carrier for the transmitted negative pulses which are representative of the temperatures encountered in the well bore by the oscillator. The outer sheath of the cable 12 is of course the ground side of circuit as is usual practice. The receiving unit B includes an amplifier, shaper and limiter 41 to which the upper end of the conductor cable 29 is connected. A suitable blocking condenser 40b is connected in the conductor 29 beyond the point at which the power supply line 40a has connection therewith and said condenser functions to prevent the current supplied by the power supply unit 40 from flowing through the cable 29 into the circuit 41. The receiving unit B also includes an Eccles-Jordan trigger circuit 42 which has connection with the amplifier, shaper and limiter 41 through a wire 41a. The trigger circuit 42 is connected through a wire 42a with a square wave amplifier and limiter 43 which also forms part of the receiver unit B. The square wave amplifier and limiter 43 has connection through a conductor 43a with an integrator 44. The units 41 through 44 are supplied with the necessary power through a suitable voltage regulated power supply P. The circuits which are included in the units 41, 42, 43 and 44 comprise the receiver B, and as will be explained, function to receive the transmitted negative pulses and to convert them into amplitude whereby said pulses may be utilized to actuate the recorder C. Actually the receiver B comprises a counter circuit or frequency meter and the particular details of its electrical circuit is subject to some variation.

The power necessary to actuate the oscillator O is supplied from the regulated power supply 40 and is conducted downwardly through the cable 29. As explained, the oscillator, when actuated, generates and transmits negative pulses, the frequency of which is controlled by the thermistor 21. This frequency is directly proportional to the temperatures which are encountered by the thermistor as the apparatus is lowered within the well bore. The power supplied from the power supply 40 is prevented from flowing through the conductor 29 to the receiver B because of the blocking condenser 40b connected in said conductor.

Figure 10:
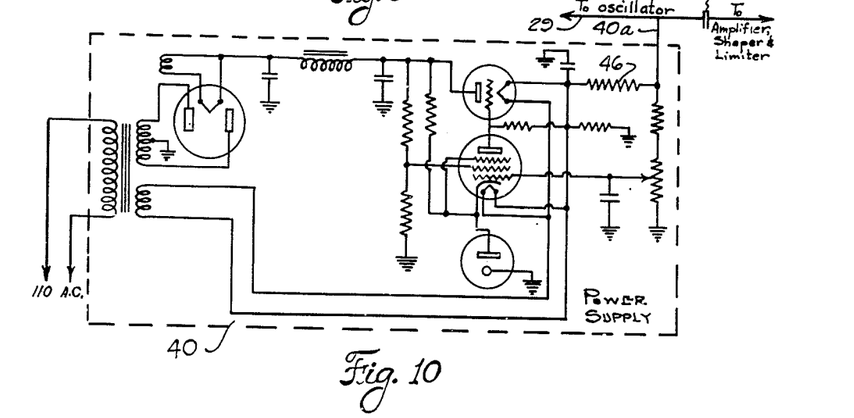
Figure 10 is a wiring diagram of the regulated power supply and illustrating the resistance which blocks the return of the transmitted impulses back into said supply.

The negative pulses which are generated by the oscillator are transmitted upwardly through the cable 29 and these pulses, at the point of generation, take the form 45 shown in the oscilloscope screen S of Figure 4. As the negative pulses travel upwardly through the conductor cable 29 they flow to the receiver unit B. Some means must be provided to prevent the transmitted negative pulses from flowing through the wire 40a and becoming dissipated in the power supply 40 and for this purpose the power supply unit 40 is provided with a resistance 46 which is connected to the supply wire 40a (Figure 10). The wiring diagram of the power supply unit which is illustrated in Figure 10 is that of a standard voltage regulated power supply and it is not believed necessary to describe the specific circuit in detail. In carrying out the present invention, this standard or usual power supply is employed with the addition of the filter resistance 46, which resistance functions to prevent the transmitted pulses flowing through the conductor 29 from passing back and becoming dissipated within the power supply unit 40.

As the negative pulses which are of the pattern or form 45 shown in Figure 4, leave the oscillator O they travel upwardly through the cable 29, and are affected by the capacitance and reactance of said cable; upon reaching the surface and just prior to their entry into the receiver B, the negative pulses have assumed the form or pattern 47 illustrated on the oscilloscope screen S of Figure 5. The amplifier, shaper and limiter 41 of the receiving unit B is provided for the purpose of returning the negative pulses to their original pattern or wave form, that is, to the same form which they had as they left the pulse oscillator O and prior to the time that they were affected by the conductor cable 29. In addition, the unit 41 limits the pattern or shape of the pulses to provide uniformity of pattern and simultaneously amplifies said pulses. The wave form or pattern of the negative pulses after they have passed through the unit 41 is illustrated at 48 on the oscilloscope screen S of Figure 6.

From this point the negative pulses travel through the Eccles-Jordan trigger circuit 42 which functions to convert the wave form into a square wave. It might be noted that the trigger circuit is sensitive only to negative pulses since as has been pointed out, the oscillator O generates and transmits only negative pulses. The square wave pattern produced by the trigger circuit 42 is illustrated at 49 on the oscilliscope screen S of Figure 7.

After the negative pulses have been converted into a square wave pattern, they flow through the square wave amplifier and limiter 43 which functions to amplify and limit the square waves. From this unit the waves are directed into an integrator 44 which as is well known, rectifies the square waves and transposes them into amplitude which is directly proportional to the frequency of the pulses and this amplitude is utilized to actuate a vacuum tube voltmeter 50, said voltmeter being connected to the integrator through a conductor 44a. The vacuum tube voltmeter 50, as will be explained, is coupled through wire 14 to the recorder C and functions to control operation of the stylus 16 of said recorder. Since the amplitude which operates the voltmeter is directly proportional to the frequency or rep rate of the negative pulses and also since said frequency or rep rate is controlled in accordance with the temperature acting upon the thermister 21, it will be evident that the amplitude will vary in direct ratio to any variation or change in temperature. Thus, the varying amplitude is a measure of the varying frequency or rep rate which in turn is representative of temperature and, therefore, it becomes obvious that the stylus provides a visible record of the variation in temperature within the well bore as it is encountered by the thermister 21.

The amplitude or voltage which is varied in accordance with the variation in frequency or rep rate of the negative pulses is, as has been explained, utilized to actuate the vacuum tube voltmeter 50. If the change in frequency or rep rate of the negative pulses was the same throughout all ranges of temperature, then the corresponding change in amplitude feeding into the voltmeter would be substantially the same in all temperature ranges and the movement of the stylus throughout all ranges of temperature would remain the same. In other words, if between 0° F. and 50° F. the frequency or rep rate of the pulses changed exactly the same amount as it changed in the range from 50° F. to 100° F. or in the range 150° F. to 200° F., then the change in amplitude flowing to the voltmeter would be the same in all ranges or stages of the operating range. However, it has been found that as the temperature within a well bore gradually increases toward its lower end, the continual change in the frequency of the transmitted pulses is not on a gradual or constant basis. In other words, in the stage or range from 0° F. to 50° F., the frequency change with the resultant change in amplitude flowing to the voltmeter may be a predetermined amount; in the next stage, from 50° F. to 100° F. the frequency change and resultant change in amplitude will be different over this 50° F. of temperature change than it was during the first 50° of temperature change. As is well known, the vacuum tube voltmeter 50 operates upon a differential of voltages and unless this differential is maintained substantially constant during each stage of the operating range, the marking stylus will not move the same distance per degree of temperature change in all stages across the chart. Because of the different rate of frequency change during the various stages in the operating range, the voltage differential occurring across the voltmeter will be different in the different stages with the result that a compensating means must be provided to assure proper movement of the stylus transversely of the chart throughout all stages of the entire operating range of the apparatus.

To accomplish proper movement of the stylus and also to amplify the reading which is obtained on the chart, it is desirable to divide the operating range of the apparatus into a plurality of stages or scales with each scale representing a predetermined number of degrees. For purposes of illustration, it will be presumed that the operating range of the apparatus extends from 50° F. to 250° F. although, of course, it is evident that it may be constructed to cover any desired range of temperatures. The first stage or scale will be assumed to cover the temperature from 50° F. to 100° F., the second from 100° F. to 150° F., the third from 150° F. to 200° F. and the fourth from 200° F. to 250° F. The 50° F. of each scale or stage is represented by a complete movement of the stylus from one side of the chart (Figure 11) to the opposite side of said chart (Figure 13) which means that during each scale or stage, the stylus moves from the left hand edge of said chart completely thereacross to the right hand edge. Since the stylus is controlled in its movement by the voltage differential occurring across the voltmeter, it becomes obvious that the voltage differential which occurs across said voltmeter from the beginning to the end of each scale must be substantially the same during each scale or stage and it is for this purpose that the particular compensating means which is illustrated in Figure 9 is provided.

It might be pointed out that during the first temperature scale of 50° F. to 100° F., a certain rate of change of voltage differential will occur across the voltmeter and the stylus will move the full width of the chart. In the next temperature scale from 100° F. to 150° F., the stylus must also move the full width of the chart but because the frequency or rep rate of the pulses and the amplitude of the integrator have increased, the same rate of voltage differential will not occur across the voltmeter as occurred during the first scale; this would result in a different movement of the stylus across the chart during the second stage than had occurred during the first stage.

Figure 9:
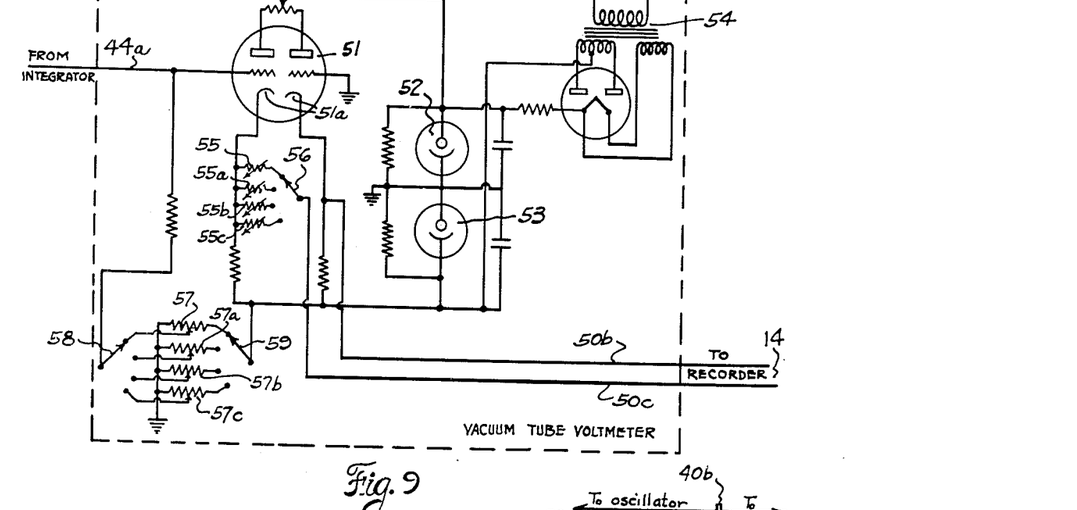
Figure 9 is a wiring diagram of the vacuum tube voltmeter and illustrating its connection to the recorder.

To sub-divide the entire operating range of the apparatus into stages or scales to thereby amplify the reading and also to assure proper movement of the stylus in all stages or scales, the electrical circuit of the voltmeter is arranged as shown in Figure 9. As illustrated, this unit comprises an ordinary vacuum tube voltmeter circuit including the tube 51 and tubes 52 and 53, as well as the transformer 54. Connected between the cathodes 51a of the tube 51 and the wires 50b and 50c which comprise the connecting conductor 14 which leads to the recorder C, are a plurality of variable or adjustable resistances 55, 55a, 55b and 55c. One of these resistances is provided for each scale or stage in the operating range and since it has been presumed that the range is divided into four scales or stages, four resistances are illustrated. The resistances 55 to 55c are preset or adjusted in a predetermined manner, in accordance with the operating frequencies as said frequencies are changed or affected by the temperatures which are encountered by the thermistor. As will be explained, each variable resistance controls one stage or scale into which the entire range has been divided and a manual switch 56 is adapted to selectively connect one of the resistances into the circuit.

As the amplitude feeding to the voltmeter through the line 44a increases due to the increased frequency of the pulses because of higher temperatures, the manual switch 56 is adjusted to connect the circuit into the next higher stage or scale and as will appear later, the resistances together with other electrical connections to be hereinafter described, function to maintain substantially the same rate of change in the voltage differential across the voltmeter throughout all stages or scales, whereby the movement of the stylus in each stage is substantially the same as movement of said stylus in all other stages.

Figure 11:
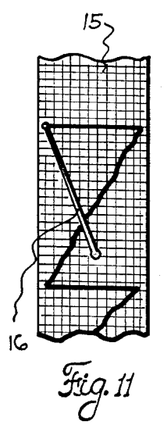
Figures 11 to 13 are enlarged views of the recording chart showing the recording stylus in various positions relative thereto.
Figure 12:
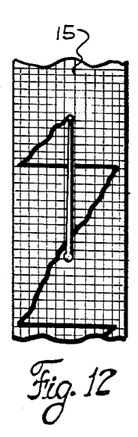

It will be evident that as the top or upper limits of each scale or stage is reached, the stylus 16 will have been moved to the right hand edge of the chart (Figure 13) so that at the beginning of the next stage, it is necessary to return the stylus to its original or starting position. In order to return the stylus to this zero or starting position relative to the chart, it is necessary to balance out the voltage or amplitude being supplied to the voltmeter by the integrator 44. For this purpose a plurality of variable resistances 57, 57a, 57b and 57c are provided. These resistances are each representative of one scale or stage in the operating range and since the range is presumed to have four stages, four of such resistances have been shown; however, it is apparent that more or less may be provided. The variable resistances 57 to 57c are adjusted in a predetermined manner and manually controlled switches 58 and 59 are adapted to selectively couple any one of said resistances to the input line 44a which extends from the integrator 44 to the voltmeter 50. The resistances 57 to 57c actually comprise a voltage dividing network and function to impose an opposite potential on the line 44a to balance out the voltage flowing to the voltmeter. Obviously when so balanced, there is no voltage differential across the voltmeter and, therefore, the stylus returns to a starting or zero position with reference to the chart, as shown in Figure 11.

In the operation of the voltmeter and recording mechanism, the amplitude or voltage from the integrator is directed to the voltmeter 50 through the conductor 44a. Presuming the temperature to be 50° F. which is the lower limit of the first stage or scale in the presumed operating range, the switch 56 is adjusted to connect the variable resistance 55, which is representative of the first scale or stage in the operating range, while the switches 58 and 59 are adjusted to connect the variable resistance 57 to the input line 44a. At a temperature of 50° F. the frequency of the generated and transmitted pulses, which are being received from the sub-surface unit, will cause a predetermined amplitude to be applied to the voltmeter 50. For purposes of illustration it will be assumed that this is five volts. The connection in the circuit of the variable resistance 57 which imposes an opposite potential on the input line 44a is so adjusted that the five volts flowing to the voltmeter are nullified or balanced out by this resistance. This causes a balanced condition across the voltmeter with the result that the stylus 16 of the recorder is moved to a starting or zero position relative to the chart, as indicated in Figure 11. The resistance 55 which is connected in the circuit by the switch 56 sets the top limit of movement of the stylus and functions to cause said stylus to halt at the right hand edge of the chart when the top limit of the particular scale or stage is reached.

Figure 13:
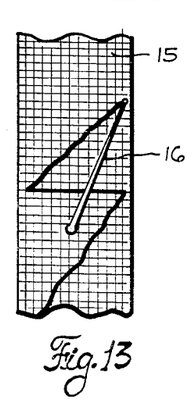

As the temperature encountered by the thermistor 21 varies and the frequency or rep rate changes, the amplitude or voltage flowing to the voltmeter 50 through wire 44a will increase and as it does, an unbalancing of the voltmeter circuit will occur, whereby the stylus will be moved transversely of the chart. Presuming that the first scale or stage is from 50° F. to 100° F., an increase of the temperature to 100° F. will cause the stylus to move to its farthest position at the right hand edge of the chart (Figure 13). The frequency of the pulses has changed because of the increasing temperature and the voltage applied to the voltmeter circuit will also have increased. For the purposes of explanation it will be presumed that the increase in voltage will be from five volts at the start of the stage (50° F.) to ten volts at the upper limit of the stage (100° F.). The device is now ready to enter the second stage or scale of the temperature range which extends from 100° F. to 150° F.

At this time, it is necessary to actuate the manual switches 56, 58 and 59 to connect the next resistances 55a and 57a in the circuit. Presuming that the increase in voltage was to ten volts, the second resistance 57a will connect a voltage of opposite potential of the value of ten volts to the line 44a to again balance the circuit and thereby return the stylus to its starting position as shown in Figure 11.

To assure proper travel of the stylus during the second stage or scale, the rate of voltage differential across the voltmeter must be the same as the rate of voltage differential which occurred during the first stage, whereby said stylus will move completely across the chart in recording the temperature change from 100° F. to 150° F. This movement of the stylus completely across the chart was affected by a five volt variation between bottom and top limits in the first stage, that is, a difference of five volts being applied to the incoming line 44a during said stage. As the temperature varies from 100° F. to 150° F., this second stage may result in a greater voltage difference between bottom and top limits of said stage; that is, instead of increasing from ten to fifteen volts or a five volt over-all change, the increase in applied voltage to line 44a may be from ten to seventeen volts. Obviously, this is different than the over-all variation in applied voltage which occurred during the first stage and would result in the stylus reaching the end of the chart before the upper limits of the second stage was reached. It is, therefore necessary to compensate for the additional two volts applied during the second stage to the end that the over-all differential across the voltmeter is five volts or the same as that which occurred during the first stage. By compensating for the different voltage differential which occurs during the various stages, it is possible to set or control the upper limit of each stage.

It is to set the upper limit and to compensate for the difference in applied voltage in the line 44a during the various stages that the resistances 55 to 55c are provided. When operating in the second stage, the manual switch 56 has connected the variable resistance 55a in the circuit and this, in effect, dissipates a predetermined voltage which will compensate for the excessive voltage occurring in the second stage whereby only the desired differential is applied to the recorder C. In the example given, the second stage (from 100° F. to 150° F.) involved a differential or change in applied voltage of from ten volts to seventeen volts and the connection of the resistance 55a would actually dissipate two volts which means that the over-all differential applied to the recorder C during the second stage is five volts. Therefore, when the applied voltage reaches seventeen volts, which is the upper limit of the second stage (150° F. temperature), the stylus will have reached the right hand edge of the chart.

Similarly, in each succeeding stage, the resistances 55b and 55c function to set the upper limits of the movement of the stylus irrespective of the over-all voltage differential which may be applied to line 44a during said stages. In other words, the function of the resistances 55 to 55c is to assure that the same voltage differential is applied to the recorder C between the lower and upper limits of each stage, whereby the stylus will always move from zero position at the bottom limit of the stage (Figure 11) to its extreme right hand position relative to the chart (Figure 13) at the upper limits of said stage.

The operation of the apparatus is believed to be apparent. The measuring unit A which includes the thermistor 21 of the pulse oscillator O is lowered downwardly through the well bore so that the thermistor is affected by the temperatures encountered therein. The recording tape or chart 15 is operated by a suitable timing mechanism which may be synchronized with the movement of the lowering cable 29 so that the length of said chart is representative of distance or elevation within the well bore. As the measuring unit A moves downwardly through the well bore, the oscillator O generates and transmits electrical negative pulses. The thermistor 21 functions to control the frequency or rep rate of said pulses in direct proportion or ratio to the temperature encountered, whereby the frequency or rep rate of the negative pulses is representative of temperature.

The transmitted pulses are conducted upwardly to the surface through the conductor cable and flow into the receiver B which, as explained, provides a counter circuit or frequency meter. Within the receiving unit B, the pulses are converted into a square wave form and are then transposed into amplitude which varies in direct ratio to the variation in the frequency or rep rate of said pulses. This amplitude is directly proportional to the change in frequency and is therefore varied in direct ratio to the temperature variations so that it might be said that the variations in amplitude are representative of the variations in temperature.

The amplitude is applied to the vacuum tube voltmeter which functions to control the movement of the stylus 16 across the moving chart or tape 15. As has been explained, the entire operating range of the apparatus is sub-divided into stages or scales so that an amplified record may be obtained. The width of the chart may be arranged to represent any desired number of degrees since each scale may be predeterminately set to represent a particular number of degrees of temperature change. Through the manual switches 56, 58 and 59, the stylus may be returned to zero position at the beginning of each stage and also the top limit of movement of said stylus may be accurately controlled so that said stylus will reach the upper limit at the same time that the themistor encounters the upper limit in temperature of each stage or scale within the well bore. With this arrangement an amplified record which permits the indication of small or minute temperature changes is provided. The device is extremely accurate since any changes or variations in the electrical properties of the cable 29, as caused by conditions encountered in the well, do not affect the operation. This is true because it is the frequency or rep rate of the pulses which actually controls the operation of the stylus and therefore even though the electrical properties of the cable may vary, there is no affect on the indications recorded by the stylus.

The foregoing apparatus is arranged to record the temperature of a well bore and provides a continuously actuated means for accomplishing this purpose. It may be desirable in some instances to also record the pressure which may be present within the well bore and Figures 15 to 20 illustrate an apparatus whereby well bore temperature and pressures may be recorded simultaneously. In this apparatus the temperature indicating and recording mechanism is as has been described and includes the negative pulse oscillator O, the thermistor 21, the receiving unit B and the recorder C. Negative electrical pulses of a predetermined or controlled frequency are transmitted to the surface through the cable 29 and through the receiver unit B function to actuate the stylus 16 of the recorder C.

Figure 20:
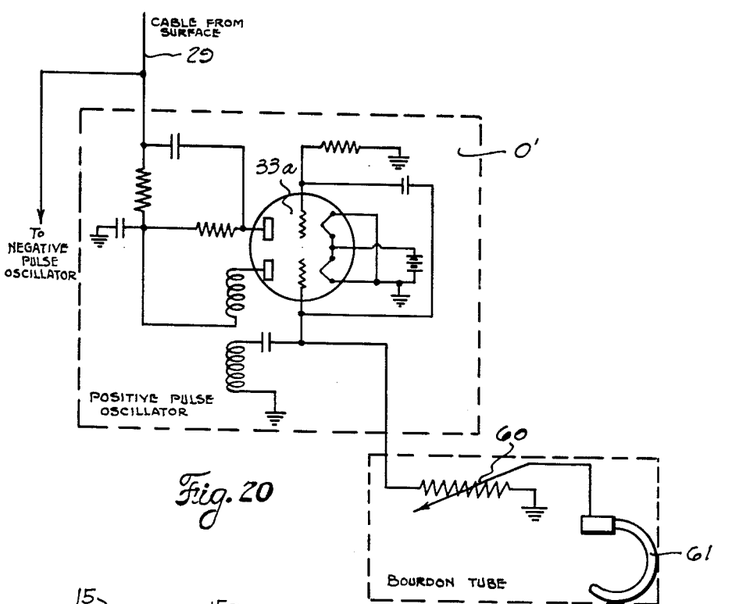
Figure 20 is a wiring diagram of the pulse oscillator which is employed for measuring pressure.

For recording the pressure which may be present within the well bore simultaneously with a recording of the temperature, a second pulse oscillator O', which is illustrated in Figure 20, is provided. The oscillator is substantially identical to the pulse oscillator O, with the exception that the two grids of its amplifying tube 33a are not directly coupled together; rather, one of the grids is biased so as to amplify only the positive side of the oscillator cycle whereby the oscillator O' generates and transmits only positive electrical pulses.

In place of the thermistor or resistor 21 which controls the frequency or rep rate of the negative pulses generated by the oscillator O, a variable resistance 60 is provided. The value of this resistance is controlled by the pressure acting upon a Bourdon tube 61, which tube is exposed to the pressure within the well bore. As this pressure varies, the resistance 60 is varied, whereby the frequency of the positive pulses which are generated by the oscillator O' is changed. It will be evident that the variation in the frequency of the positive pulses will be varied in direct ratio to the variation in pressure acting upon the tube 61.

The positive pulses, which are generated by the oscillator O and the frequency or rep rate of which is representative of pressure, are transmitted upwardly through the single conductor 29 along with the negative pulses being generated by the oscillator O. The wave form or pattern of the positive and negative pulses as they travel simultaneously up the cable 29 are illustrated in the oscilliscope screen of Figure 16. Both positive and negative pulses flow past the blocking condenser 40b in the conductor 29 and the negative pulses then pass through the receiver B as has been explained, to actuate the recorder C and thereby record temperature. The positive electrical pulses are conducted through a wire 62 from the conductor 29 and to a second receiver B' which is a substantial duplicate of the receiver B. The circuit of the receiver B' is identical to the circuit of the receiver, with the exception that the Eccles-Jordan trigger circuit of receiver B is sensitive only to the positive pulses, rather than to negative pulses as is the trigger circuit 42 of the receiver B. The receiver B' functions to convert the positive pulses into square wave form and the integrator thereof rectifies and transposes the same into amplitude which is utilized to actuate a vacuum tube voltmeter 50'. The voltmeter is electrically connected to a second recorder C' which has a recording chart 15' and a stylus 16'. The recorder C' is a duplicate of the recorder C and is actuated in an identical manner.

Figures 14, 15, 16, 17, 18, 19:
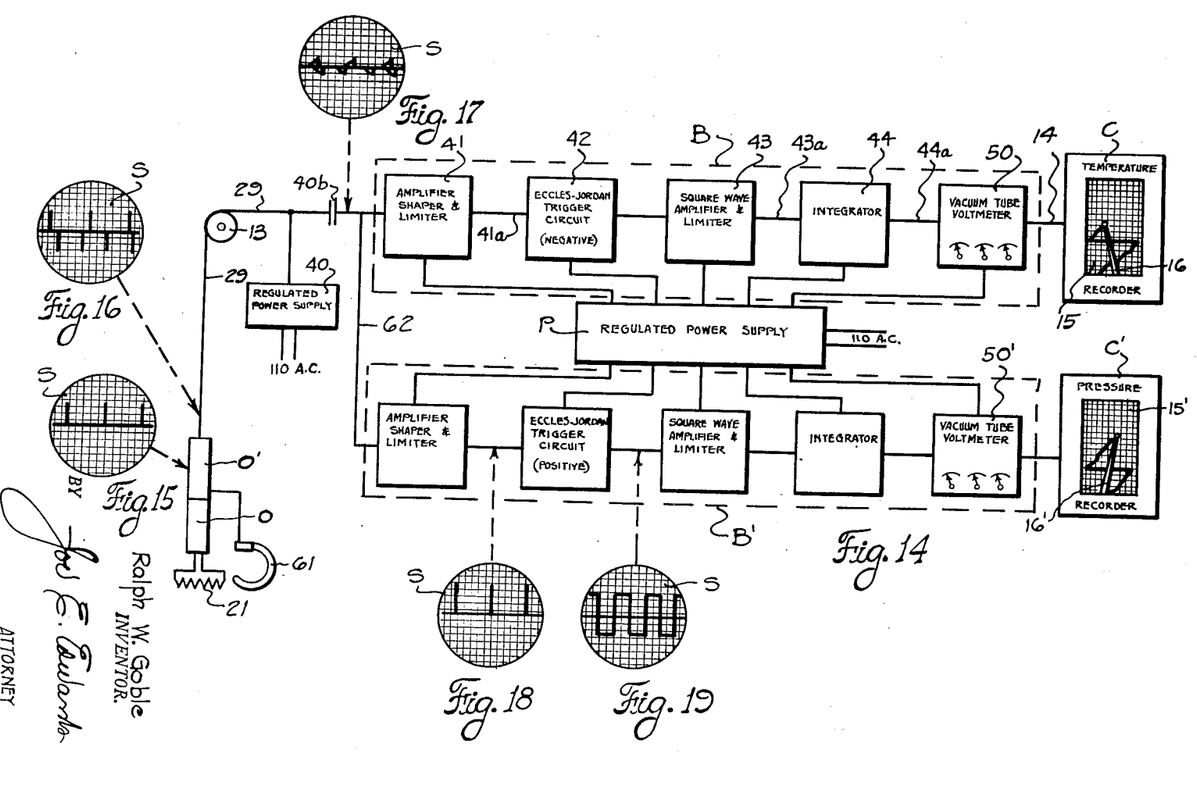
Figure 14 is a block diagram of an apparatus, constructed in accordance with the invention and arranged to simultaneously record both the temperature and pressure conditions present within a well bore.
Figures 15 to 19 are face views of an oscilloscope screen, illustrating the wave forms of the electrical pulses which are representative of the pressure being measured.

The temperature recording mechanism of the unit shown in Figure 14 will operate in the manner heretofore described to properly record the temperature within the well bore. The Bourdon tube 61 which is exposed to the pressure within the well bore will control the resistance 60 in the circuit of the positive pulse oscillator, whereby the frequency or rep rate of the generated positive pulses will be varied in accordance with pressure changes. Thus, the frequency or rep rate of the positive pulses will be representative of pressure.

The positive pulses are transmitted upwardly through the cable 29 and thence to the receiver B' and the pattern or wave form of the pulses at various points in the circuit are illustrated in Figures 17, 18 and 19 which show oscilliscope screens S. By means of the circuit within the receiver B', the positive pulses are converted and transposed into amplitude which is utilized to actuate the vacuum tube voltmeter 50'. The voltmeter in turn controls the operation of the stylus 16' of the recorder C' to visibly indicate the pressure encountered within the well bore. It is evident that the amplitude flowing from the integrator to the voltmeter 50' will be in direct ratio or proportional to the pressure which is present within the well bore and thus an accurate record of the pressure changes within said bore is produced. It might be noted that the voltmeter C' is of the same construction as the voltmeter C, whereby the operating range of the pressure recorder C is sub-divided into stages or scales to provide an amplified indication.

The apparatus for recording pressure has all of the advantages which the apparatus for recording temperature includes. Since the frequency is varied in accordance with pressure changes, accurate readings may be obtained without having changes in the electrical properties of the cable affect the operation. By producing electrical negative pulses for temperature and electrical positive pulses for pressure, a simultaneous recording of temperature and pressure conditions may be accomplished. However, the invention is not to be limited to simultaneous recording since it is readily apparent that the temperature may be recorded independently of pressure and, similarly, pressure may be recorded independently of temperature.

The particular feature of the invention resides in the use of an oscillator which generates and transmits electrical pulses, the frequency or rep rate of which is controlled by an electrical resistance. The arrangement is such that the variations in the resistances are caused by the particular measurement being made and it is apparent that other measurements besides pressure or temperature could be made. By controlling the frequency or rep rate of the transmitted pulses, this frequency or rep rate is representative of the particular measurement being made and obviously accurate information may be obtained at the surface since the temperature present within the well bore will not affect said frequency. As is well known, the temperature present within the well bore will affect the electrical properties of a conductor cable but by employing the frequency or rep rate as the particular electrical characteristic which is measured, outside influences on the cable will not interfere with accuracy of measurement. As used herein and in the claims the term "rep rate" is in fact the repetition rate, that is, the number of pulses per unit of time which are generated by the oscillator.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A temperature and pressure measuring apparatus including a first oscillator for generating a series of electrical pulses of one polarity; a second oscillator for generating a series of electrical pulses of opposite polarity; temperature responsive means connected to said first oscillator for varying the frequency of said first series of pulses in accordance with the temperature encountered by said temperature responsive means; pressure responsive means connected to said second oscillator for varying the frequency of said second series of pulses in accordance with the pressure encountered by said pressure responsive means; means for transposing said first and second series of varying frequency pulses into visual indications; a common transmission line connecting said first and second oscillators to said transposing means; said transposing means including first circuit means responsive only to said series of pulses of said one polarity and an indicating means connected to said first circuit means for indicating temperature; said transposing means including also second circuit means responsive only to said series of pulses of said opposite polarity and a second indicating means connected to said second circuit means for indicating pressure.

2. In a measuring and indicating apparatus for measuring and indicating physical conditions in a well bore wherein a measuring unit is adapted to be lowered within a well bore and generates electrical pulses, the repetition rate of which varies in accordance with the measured condition, and wherein said pulses are transmitted to the surface, the improvement which resides in a recording mechanism including, electrical means for receiving the transmitted impulses, electrical means for converting the received repetition rate of the pulses into amplitude, a vacuum tube voltmeter electrically connected with the converting means and having the amplitude supplied thereto, whereby a voltage differential is impressed across the voltmeter which is proportional to the amplitude and is therefore representative of the repetition rate of the pulses and of the conditions being measured, a recording chart, a movable stylus, means for electrically connecting the voltmeter to the stylus to impart movement to said stylus in accordance with the voltage differential across the voltmeter to visibly record the conditions being measured, a series of electrical resistances adapted to be selectively connected in the electrical circuit of the voltmeter, each resistance having a predetermined electrical value different from the value of the other resistances for dividing the entire operating range of the voltmeter into stages, and manual means for selectively connecting one of the resistances in the voltmeter circuit to balance out the applied amplitude and thereby return the stylus to zero or starting position on the recording chart, and a second series of electrical resistances adapted to be selectively connected in the voltmeter circuit with each resistance of said series having a value different than the other resistances of that series, connection of each resistance in the voltmeter circuit impressing a compensating voltage on the circuit to cause the same range of voltage differential across the voltmeter to occur in each stage of operation whereby the stylus is moved the same distance throughout each stage.

References Cited in the file of this patent

UNITED STATES PATENTS

| Number | Name | Date |
|---|---|---|
| 955,191 | Northrup et al. | Apr. 19, 1910 |
| 1,951,276 | Edwards et al. | Mar. 13, 1934 |
| 2,137,985 | Salvatori | Nov. 22, 1938 |
| 2,225,668 | Subkow et al. | Dec. 24, 1940 |
| 2,277,427 | Woodson | Mar. 24, 1942 |
| 2,372,582 | Kean | Mar. 27, 1945 |
| 2,382,609 | Dale | Aug. 14, 1945 |
| 2,412,575 | Frosch | Dec. 17, 1946 |
| 2,414,719 | Cloud | Jan. 21, 1947 |
| 2,517,455 | Waters | Aug. 1, 1950 |